(12) United States Patent  
Cohen

(10) Patent No.: US 6,862,445 B1
(45) Date of Patent: Mar. 1, 2005

(54) SECONDARY CARRIER MESSAGING AND ADVERTISING METHOD FOR WIRELESS NETWORK PORTABLE HANDSETS

(75) Inventor: Marc Cohen, Lincolnwood, IL (US)

(73) Assignee: 67 kHz, Inc., Evanston, IL (US)

( * ) Notice: Subject to any disclaimer, the term of this patent is extended or adjusted under 35 U.S.C. 154(b) by 0 days.

(21) Appl. No.: 09/552,195

(22) Filed: Apr. 19, 2000

(51) Int. Cl.$^7$ .................................................. H04M 1/00
(52) U.S. Cl. ............................... 455/412.1; 455/414.1; 455/556.1
(58) Field of Search ............................ 455/412.1, 413, 455/414.1, 414.4, 466, 550.1, 552.1, 553.1, 556.1, 557; 705/14, 26, 27; 340/825.69

(56) References Cited

U.S. PATENT DOCUMENTS

| | | | | |
|---|---|---|---|---|
| 4,481,382 A | * | 11/1984 | Villa-Real | 455/556.1 |
| 5,003,576 A | * | 3/1991 | Helferich | 455/412 |
| 5,117,449 A | * | 5/1992 | Metroka et al. | 455/552 |
| 5,687,216 A | * | 11/1997 | Svensson | 455/412 |
| 5,752,186 A | * | 5/1998 | Malackowski et al. | 455/414 |
| 5,852,775 A | * | 12/1998 | Hidary | 455/412 |
| 5,886,647 A | * | 3/1999 | Badger et al. | 340/825.69 |
| 6,064,876 A | * | 5/2000 | Ishida et al. | 455/412 |
| 6,195,544 B1 | * | 2/2001 | Shimazaki | 455/412 |
| 6,278,884 B1 | * | 8/2001 | Kim | 455/556.1 |

* cited by examiner

*Primary Examiner*—Quochien B. Vuong
(74) *Attorney, Agent, or Firm*—Greer, Burns & Crain, Ltd.

(57) ABSTRACT

Messages are pushed to handsets using a secondary carrier channel separate from the wireless network. The handset includes a secondary carrier receiver, which may share a power source and other components with the wireless network receiving hardware included in the handset. When the handset receives a message broadcast over the secondary carrier channel or one of multiple secondary carrier channels, the message is then stored in a message memory of the handset. A stored message is output from the message memory in a user understandable format, e.g., audibly or visually, through the handset hardware in response to a predetermined operation of the handset. A stored message may be output in response to a "send" operation of the handset, prior to the establishment of a communication link between the handset and a base station of the wireless network. In the case where message output occurs in response to a "send", the user will be listening for the call to be connected and an excellent opportunity is presented for a short advertising message. The preferred secondary channel is the commercial AM or FM radio sub-carrier channel. The handsets and method for message delivery provide for a novel method to promote an entity, which can subsidize the cost of handsets for distribution to targeted persons. The handsets then receive messaging that promotes the entity for a period.

5 Claims, 6 Drawing Sheets

SECONDARY CARRIER MESSAGING AND ADVERTISING METHOD FOR WIRELESS NETWORK PORTABLE HANDSETS

FIELD OF THE INVENTION

The primary field of the invention is wireless communication. The invention concerns a messaging method for a portable handset. Other fields of the invention are the field of messaging and the field of advertising.

BACKGROUND OF THE INVENTION

Targeting is an important tool in advertising. The recipient's attention is also an important consideration. Reaching a particular audience and having their attention during advertising message delivery is an obvious goal of any advertiser. A largely untapped medium for delivering advertising, and other message content such as news, sports, etc., is the wireless network communication medium.

A precious commodity in a wireless communication network, such as a cellular or PCS network, is network capacity. Most consumers are familiar with the value of capacity through billing plans which determine their monthly cost for having a handset access a network on the basis of usage minutes.

The primary use for a handset in a wireless communication network is that of a telephone. However, additional services are now being packaged in a handset, as the wireless communication network handset evolves into a multipurpose communication device. Paging functions, Internet communications, and two-way radio functions, are examples of functions that are becoming more common in wireless communication handsets. Messaging, the delivering of data content to a handset for delivery to the handset user, is an emerging function. Messaging might be used, for example, to deliver general interest information ranging from sports scores to stock quotes. The likely most important type of messaging content, though, would be promotional in nature.

Presently, there are two primary methods of pushing content, i.e., delivering messages, to wireless communication network handsets. A method called Short Message Service Cell Broadcast (SMSCB) is limited to the GSM (Global System for Mobile) cellular protocol. In SMSCB, messages are transmitted over the GSM network's control signal. Each SMSCB message is limited to 93 alphanumeric characters. A message is sent by the network operator to a selected group of network base stations for transmission to enabled handsets within their range. Some SMSCB messaging methods have been implemeted in Europe and the Middle East. In Germany, a SMSCB messaging service sends news messages ten times a day. In Lebanon, a network is used to send SMSCB messages in a daily schedule that includes advertising messages, weather messages, and traffic, financial, horoscope, sports and airport information messages. A second method, General Packet Radio Service (GPRS), is a nonvoice value added service in which information is sent and received across a wireless network. GPRS is supported in the GSM and TDMA (time division multiple access) protocols. GPRS shares the main signal with voice traffic, as opposed to the control signal used in SMSCB. Because the packets of message information in GPRS are separated into packets and transmitted in the fashion of voice traffic, the message length does not have the strict limits imposed by SMSCB. A cell broadcast in GPRS requires that the sender, rather than the receiver, initiate the message which terminates in the handset as opposed to the base stations. Typical wireless networks are set up to bill such a transaction to the receiver, resulting in the undesirable situation of having potentially unsolicited messaging being billed to the user of a handset. This is a primary reason that there is limited support in the industry for GPRS messaging.

Thus, there is a need for an improved messaging method for wireless communication networks which addresses some or all of the aforementioned drawbacks. It is an object of the invention to provide such an improved messaging method. It is a further object of the invention to make advertising broadcasts practical and desirable in a wireless communication network.

SUMMARY OF THE INVENTION

These and other needs and objects are satisfied by the present secondary carrier messaging method for wireless network handsets. In the method of the invention, messages are pushed to handsets using a secondary channel that is separate from the wireless network and is suitable for messaging broadcasts. A preferred secondary channel is the commercial FM or AM radio sub-carrier channel, but other basebands supporting a message broadcast would also be suitable. Alternate message bands include, for example, commercial AM and FM channels. The handset includes a secondary carrier receiver, which preferably shares a power source and other components with the wireless network receiving hardware included in the handset. When the handset receives a message broadcast over the secondary carrier channel, or one of multiple secondary carrier channels, the message is then stored in a message memory of the handset. A stored message is output from the message memory in a user understandable format, e.g., audibly or visually, through the handset hardware in response to a predetermined operation of the handset. As a preferred example, a stored message may be output in response to a "send" operation of the handset, prior to the establishment of a communication link between the handset and a base station of the wireless network. In the case where message output occurs in response to a "send", the user will be listening for the call to be connected and an excellent opportunity is presented for a short advertising message.

In a preferred embodiment of the invention, advertising or promotional messages are broadcast via a FM or AM sub-carrier signal. Handsets to which the messages are directed are equipped with a sub-carrier receiver as well as the transceiver used for wireless network communications. Scan tuning or another technique may be used for multiple sub-carrier channels. Received messages are stored in memory, and output via the speaker or display of the handset after a user presses the handset "send" button and prior to the initiation of a call. A preferred feature skips message display when the handset is contacting an emergency system, e.g., 911.

The handsets and method for message delivery provide for a novel method to promote an entity, which can subsidize the cost of handsets for distribution to targeted persons or provide subsidized air time to targeted persons. The handsets then receive messaging that promotes the entity for a period.

BRIEF DESCRIPTION OF THE DRAWINGS

Other features, objects and advantages of the invention will be apparent to those skilled in the art by reference to the detailed description and the drawings, of which.

DETAILED DESCRIPTION OF THE INVENTION

According to the present invention messaging content is delivered to a handset that is part of a wireless communication network without use of the network. Instead, the messaging content is pushed to a handset over a secondary carrier channel. The messaging content preferably comprises advertising messages. Handset usage provides defined periods of user attention when short advertising messages previously received via a secondary carrier broadcast can be output (played) from memory in the handset. Thus, for example, a handset user hears an advertising message played from memory while waiting for a call connection after having pressed the "send" button on the handset.

The preferred sub-carrier channel is outside the baseband of commercial FM or AM transmission and provides a practical means for broadcasting messaging content to handsets. The Subsidiary Communications Authority, also known as a sub-carrier, sideband, SCA band, or SCA (sub-carrier) is a separate, nonbaseband audio or data signal which is multiplexed onto the carrier (baseband) audio signal over a broadcast FM or AM radio station. Radio stations typically dedicate transmission power to one or two sub-carrier channels in addition to their main signal. No FCC authorization, notice, or application of license is required by the broadcast station to transmit a sub-carrier signal. 47 CFR § 73.127 (AM stations), 47 CFR 73.293 (FM stations). FM sub-carriers are required to be in the 20 to 99 kHz range when monophonic programs are broadcast and in the 52 to 99 kHz range when stereophonic programs are broadcast.

The method of the invention is implemented by a secondary carrier broadcast of message content over one or more secondary carrier channels. Wireless communication network handsets within the broadcast area and which are equipped with an appropriate secondary carrier receiver receive and store the messages for output to a user in response to a predetermined operation of the handset, e.g., a send operation. Preferably, a handset used in the invention includes a secondary carrier receiver that shares components with the wireless network transceiver in the handset.

Figure 1:
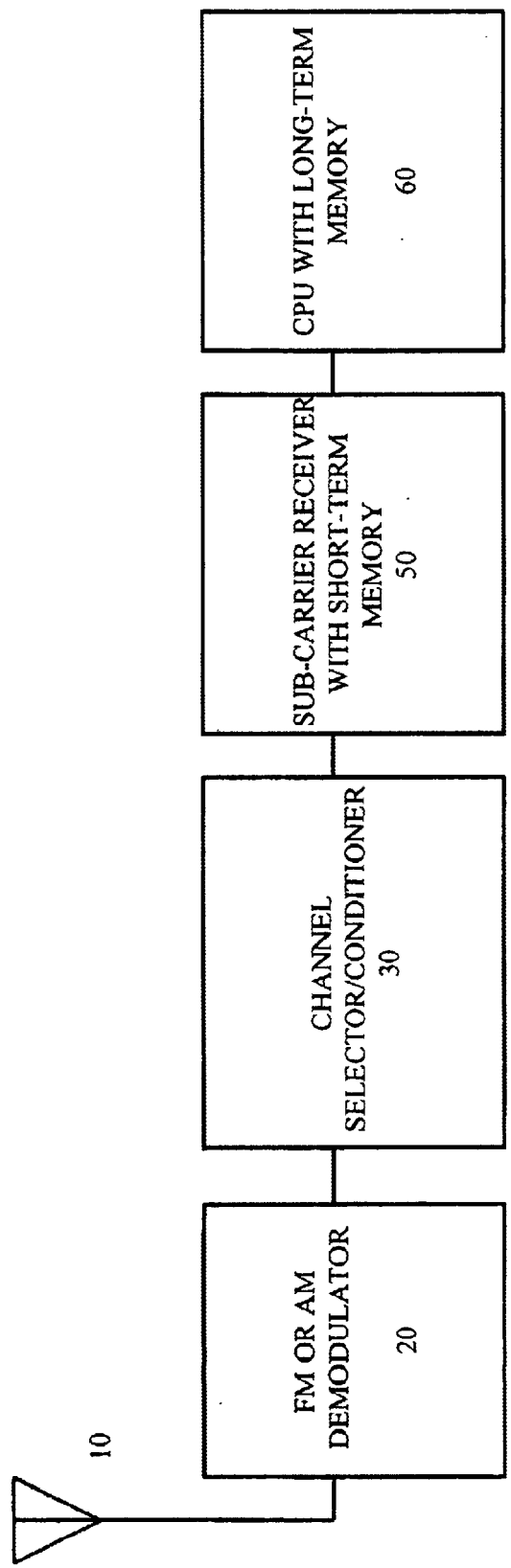
FIG. 1 is a block diagram of a preferred digital sub-carrier messaging receiver system for inclusion in a handset to implement the present invention.

Referring now to FIG. 1, the basic components of a preferred digital sub-carrier receiver system for incorporation into a wireless network handset is shown in FIG. 1. Sub-carrier message broadcasts impinge upon an antenna 10, and the signals are demodulated by an appropriate demodulator 20, which may be AM or FM. The signal from the demodulator is sent to circuitry to a channel selector and conditioner 30, which selects the sub-carrier message channel and prepares the signal, e.g., amplifies, for decoding by a receiver 50. Preferably, the receiver 50 includes a small amount of short term memory to temporarily store decoded messages. Such short term storage permits a CPU or controller board 60 to manage its long term memory in the event that a newly received message would cause a memory overflow. A newly decoded message, after any required long term memory management, is sent to the controller 60 for storage in its long term memory, which serves as a message memory from which a message is output in response to a predetermined handset operation. An analog receiver is shown in FIG. 2, and is identical to the digital receiver of FIG. 1, except that the analog receiver includes a digitizer 70 to convert decoded messages into digital form for storage and display.

Figure 2:
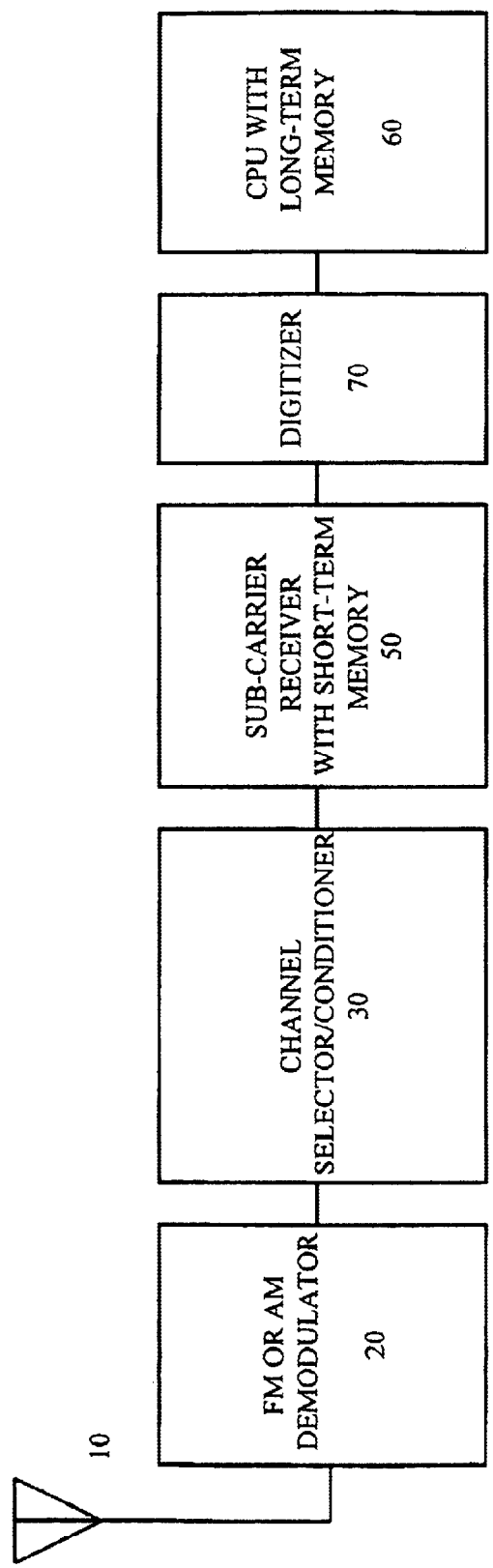
FIG. 2 is a block diagram of a preferred analog sub-carrier messaging receiver system for inclusion in a handset to implement the present invention.

The channel selector 30 in either of the FIG. 1 or 2 embodiments is preferably selectable so that a handset including the sub-carrier messaging receiver may receive messages at different frequencies and modulations. This feature can be used to support different types of messaging contents on separate channels that can be selected by a user, selectively controlled by the receiver controller 60 without user input, or set at the time of manufacture, or set by dealers or technicians. The channel selector may scan frequencies, may be directed to a frequency by a received control signal, or it may be set by a switch or other type of selector.

Figure 3:
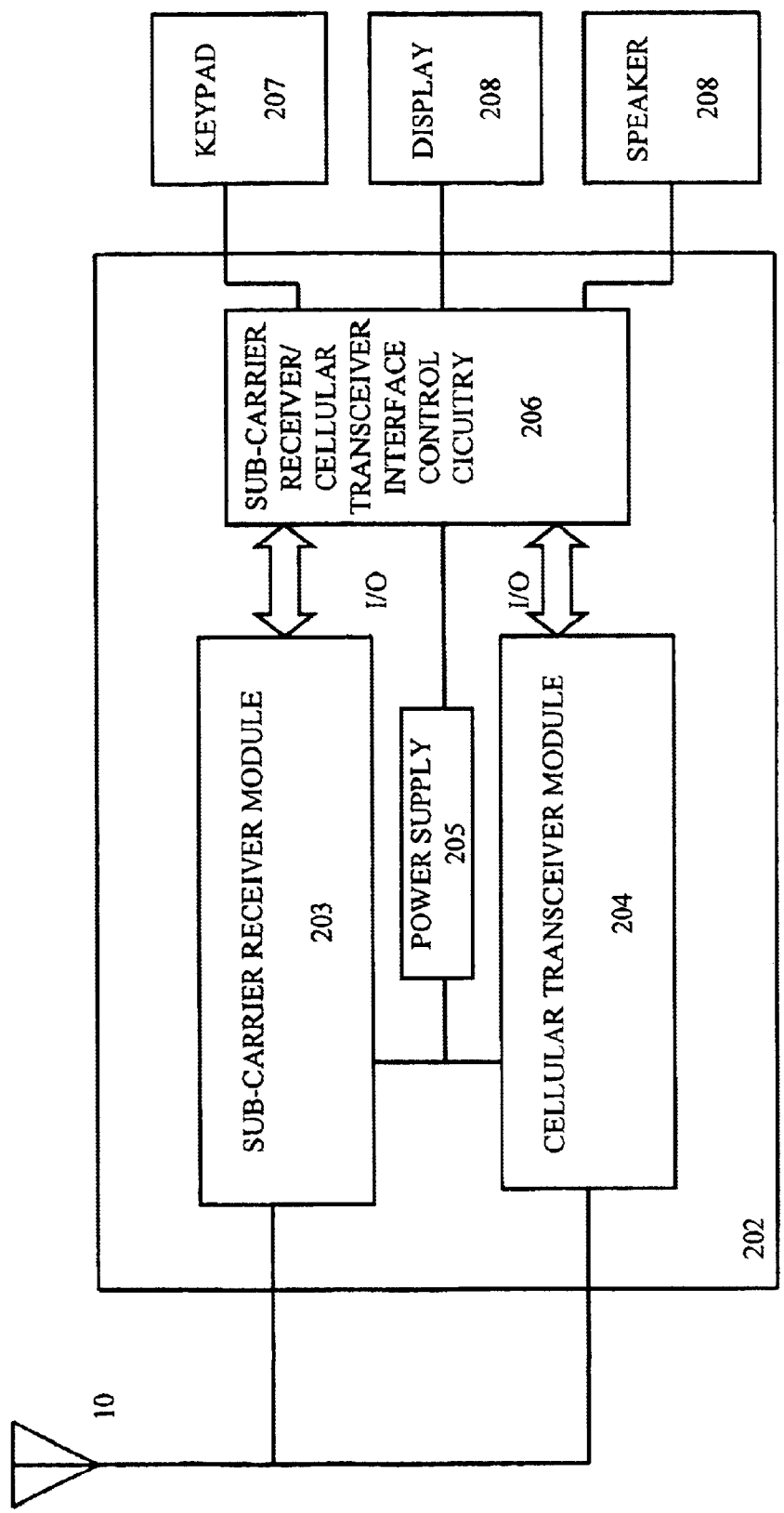
FIG. 3 is a block diagram of a preferred handset mother board including a sub-carrier messaging receiver in accordance with the present invention.

As previously mentioned, it is preferred that a handset which incorporates a sub-carrier messaging receiver of the invention is arranged so the messaging receiver shares components with the wireless communication network transceiver included in the handset. FIG. 3 depicts a preferred motherboard 202 for meeting this objective. In FIG. 3, a common antenna 10 (also see FIGS. 1 and 2) feeds a sub-carrier receiver module 203 constructed in accordance with the general principles of FIG. 1 or 2 and a wireless network transceiver, e.g., a cellular transceiver module 204. The sub-carrier receiver module 203 and the cellular transceiver module 204 share a common power supply 205 and communicate with an interface 206 to a handset keyboard 207, display 208, and speaker 209.

Figure 4:
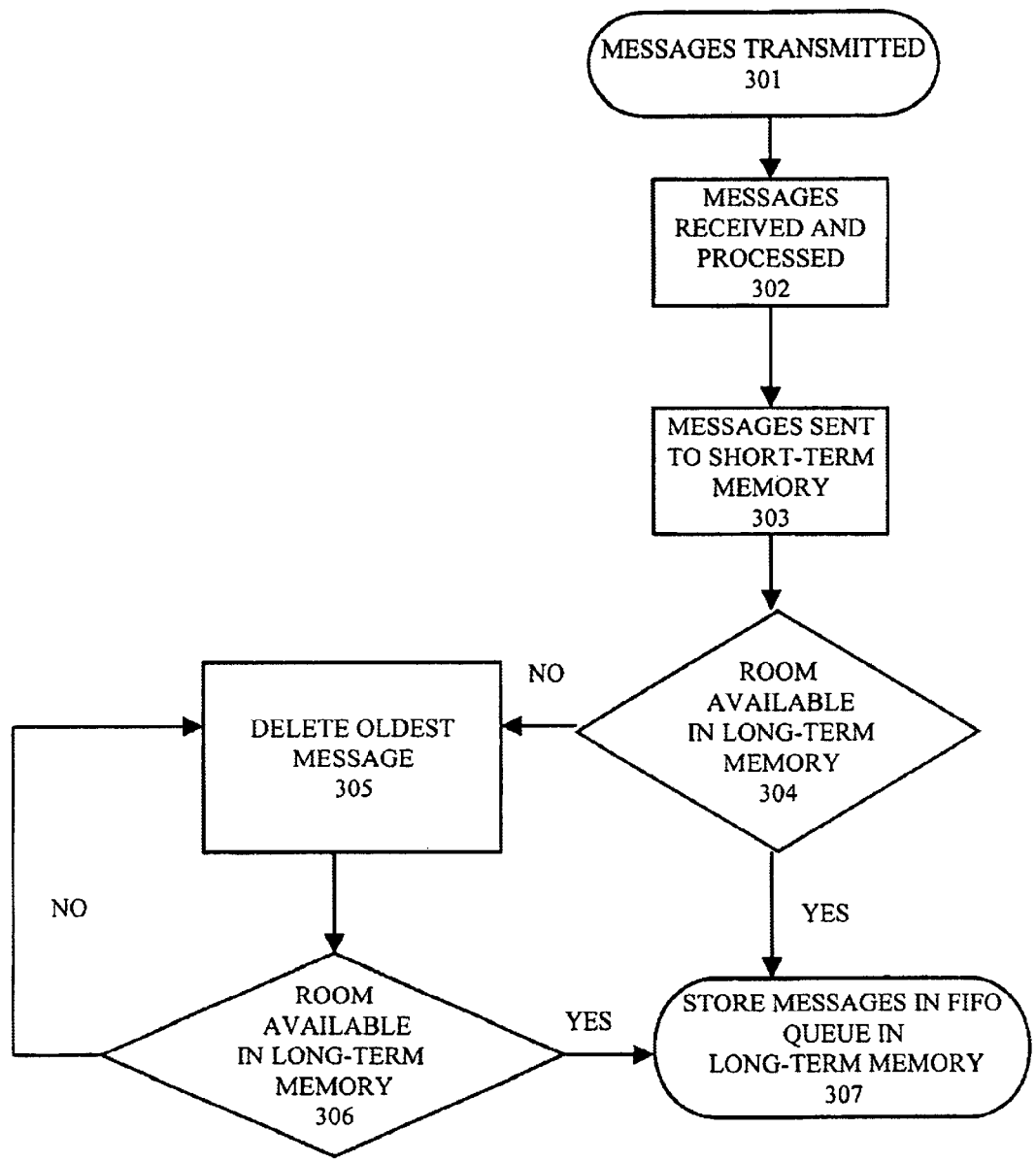
FIG. 4 is a flowchart illustrating a preferred digital message receipt and storage method according to the present invention.
Figure 5:
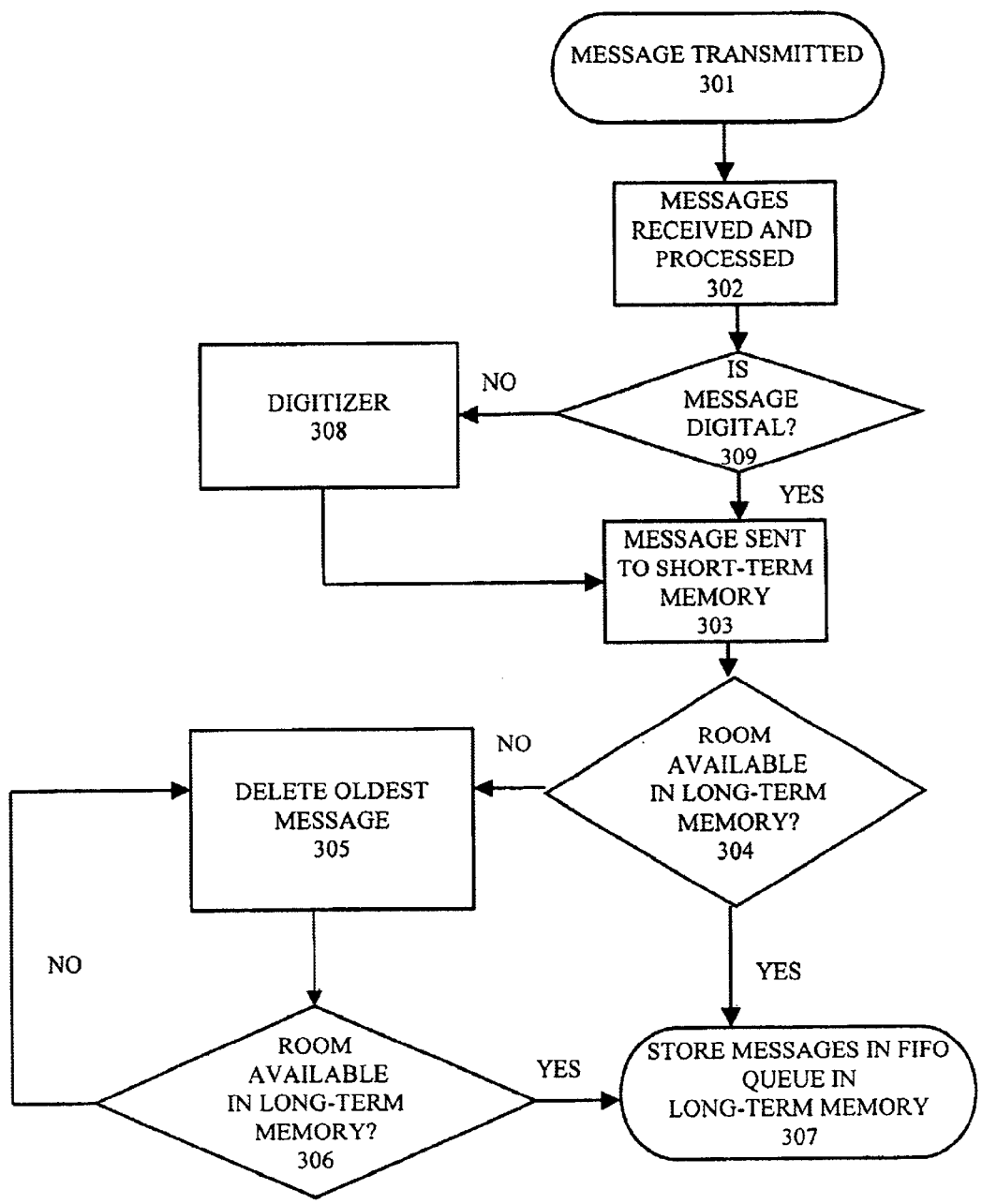
FIG. 5 is a flowchart illustrating a preferred analog message receipt and storage method according to the present invention.

Preferred steps for implementing digital sub-carrier messaging receipt in a handset including a messaging receiver according to FIG. 1, and incorporated into a handset, for example, in accordance with FIG. 3, are illustrated in FIG. 4. In FIG. 4, messages are transmitted via a message broadcast 301 and are received and processed by sub-carrier messaging receiver equipped handsets 302 within the broadcast reception area. Decoded received messages are stored temporarily in short term memory 303, while long term memory is checked 304 to see if storage space is available for the newly received and decoded message. If no room is available, the oldest message in long term memory is deleted 305. The memory is checked again 306, and the deleting and checking is repeated until room is made available for the newly arrived message. Once room is available, the newly arrived message is stored into long term memory 307. Storage, for example, is managed as a first-in-first-out (FIFO) queue. The memory management of FIG. 4 is generally based upon FIFO management but other schemes might be supported including priority schemes based upon the message content. A combined analog and digital sub-carrier message receiving method is shown in FIG. 5, and will support both analog and digital message receipt. The FIG. 5 method is identical to the FIG. 4 method, but includes additional steps for checking to see if a newly decoded message is digital 308 and, if not, digitizing the message 309.

Figure 6:
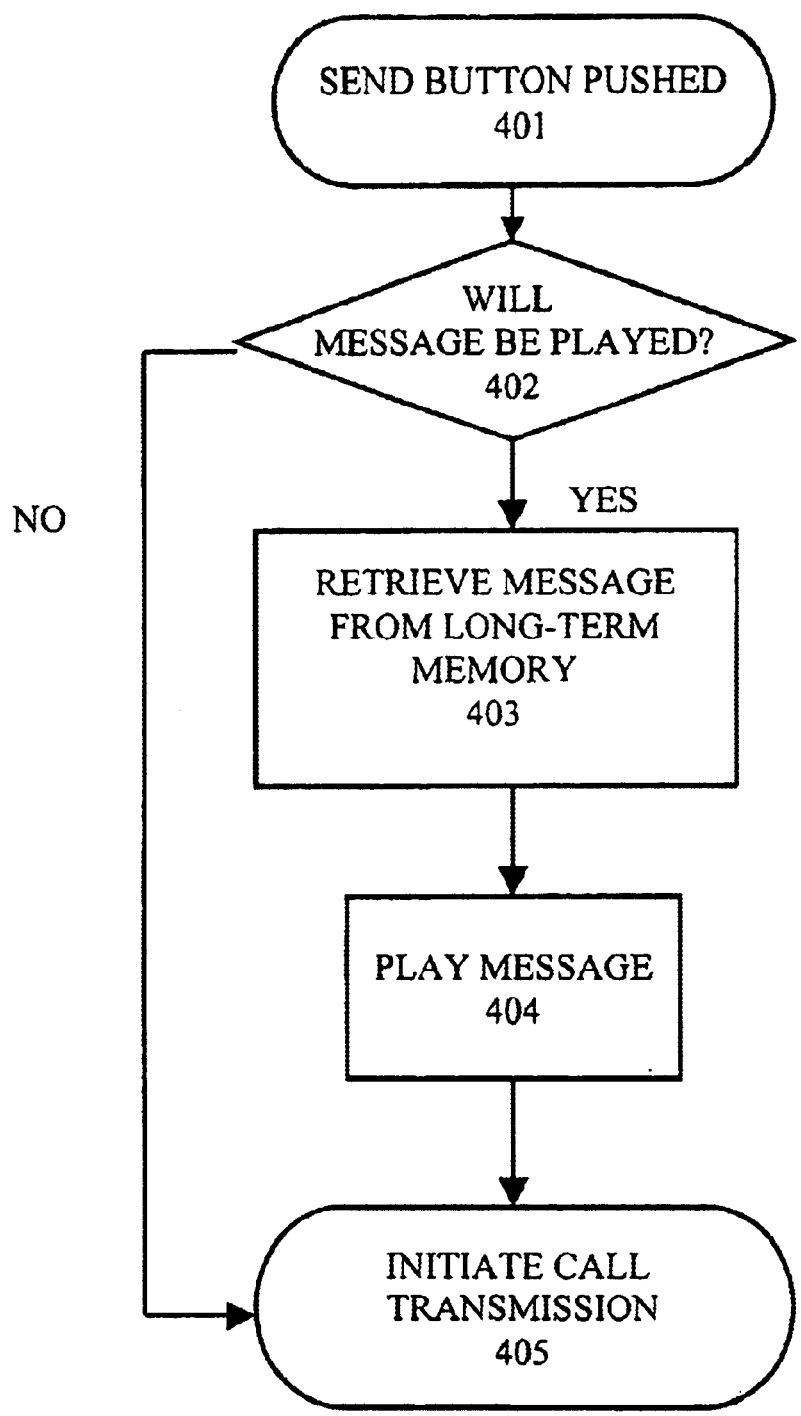
FIG. 6 is a flowchart illustrating a preferred message playing algorithm of the invention.

The output (playing) of messages that have been received and stored in memory is responsive to a predetermined operation of the handset. A preferred example is a send operation. When a user presses the send button, a message, such as an advertising message, is output to the user from long term memory. Preferred steps for display are shown in FIG. 6. In 401, a handset operation occurs, such as a send operation. An optional feature is to determine whether a message should be played 402. This might be desirable to avoid outputting a message when an emergency call is initiated, to avoid outputting messages too frequently, or under some other circumstance. If the message is to be played (output), then it is retrieved from long term memory 403 and played 404. After completion of message playing, the operation of the phone is allowed to proceed 405. In the case where a send operation triggered the message playing, the operation which proceeds is the handset's initiation of a wireless network call transmission. The message play after send operation might also be used independently to play messages which may or may not be received via a secondary channel. For example, new phones might be distributed with a limited number of messages stored in memory and could be programmed to play the messages for a limited or continued period of time each time the send button is pressed.

Artisans will appreciate that the invention provides an effective way to provide advertising messages, promotional messages and other types of messaging contents to wireless network handsets without using the wireless network as a transmission medium. Short messages in audible form, or displayed visually reach handset users. The timing of message output can be selected to correspond to a handset operation when the user is known to be paying attention, such as the time when a user is waiting for a call to connect by listening through the handset speaker.

The secondary carrier messaging method and devices of the invention further provide a novel method of promotion by messaging. An advertiser or promoter can assist in the distribution of secondary carrier messaging receiver as a means of defining a set of targeted message recipients. An advertiser or promoter partners with an entity, i.e., an organization or individual, wishing to promote itself, its mission, its products, to a targeted group of people. The entity is provided with handsets in accordance with the invention, and the handsets preferably include indicia such as a trademark or logo indicating the entity. The handsets are distributed to target persons for no charge or a discounted charge. An event provides a preferred method to gather individuals for distribution of handsets. The promoter or advertiser then provides message broadcasts to the distributed handsets for a limited period, after which the broadcasts cease. Wireless network service providers might act as promoters, or might join with an advertiser or promoter to sell the promotion service to organizations and individuals. Alternatively, organizations might provide for the handset costs and for broadcast of third party messaging in return for a payments from third parties. Similarly, the cost of air time could be offered or discounted to a group of targeted persons as a way to provide a target group of message recipients. This might be used, for example, to extend a period of messaging to users promised a limited period of messaging in a promotion which distributed free or discounted handsets.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A messaging method for a wireless network portable handset the method comprising steps of:

receiving messages broadcast on a secondary broadcast carrier frequency separate from the wireless network;

storing messages in a memory of the handset;

outputting a message from the memory in a user understandable format in response to a predetermined operation of the handset, wherein the predetermined operation of the handset comprises a send operation.

2. A messaging method for a wireless network portable handset the method comprising steps of:

receiving messages broadcast on a secondary broadcast carrier frequency separate from the wireless network;

storing messages in a memory of the handset;

outputting a message from the memory in a user understandable format in response to a predetermined operation of the handset; and checking, after said step of receiving, the format of a received message; then if the received message is in analog format, converting the received message to digital format prior to said step of storing.

3. A messaging method for a wireless network portable handset, the method comprising steps of:

receiving messages broadcast on a secondary broadcast carrier frequency separate from the wireless network;

storing messages in a memory of the handset;

outputting a message from the memory in a user understandable format in response to a predetermined operation of the handset;

temporarily storing a newly received message in a short term memory;

checking a long term memory to see if space is available for the newly received message, then, if room is not available in the long term memory, freeing space in long term memory for the newly received message, and storing the newly received message in the long term memory.

4. A messaging method for a wireless network portable handset, the method comprising steps of:

receiving messages from a broadcast carrier without use of the wireless network;

storing messages in a memory of the handset;

outputting a message from the memory in a user understandable format in response to a send operation of the handset.

5. The claim according to claim 4 wherein the secondary broadcast carrier is a non-network carrier.

* * * * *